Figure 1:
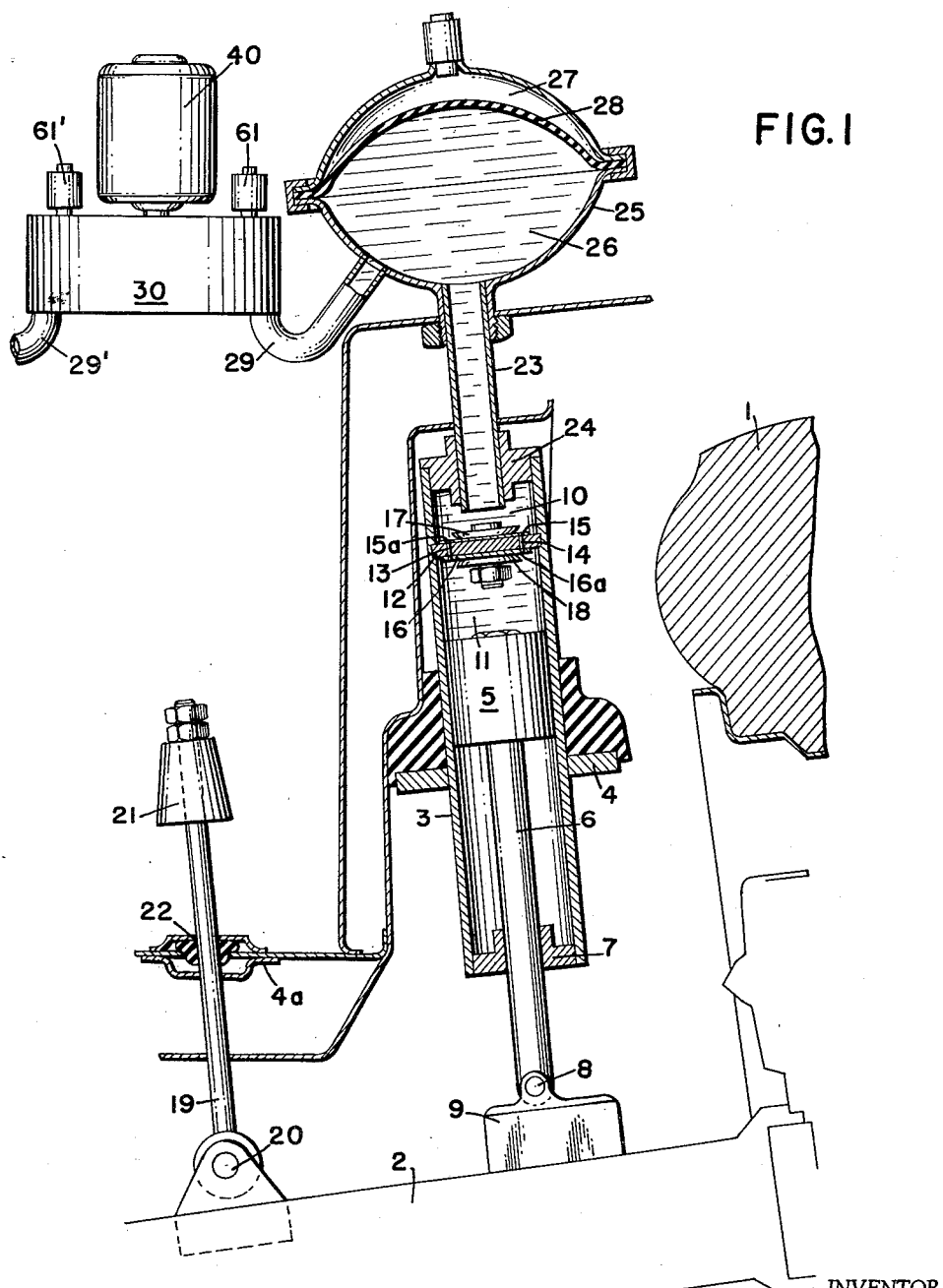

INVENTOR
FERNAND STANISLAS ALLINQUANT
BY Robert Henderson
ATTORNEY

INVENTOR:
FERNAND STANISLAS ALLINQUANT

BY *Robert Henderson*
ATTORNEY

United States Patent Office 3,049,360
Patented Aug. 14, 1962

3,049,360
TRIM CORRECTOR DEVICE FOR VEHICLES PROVIDED WITH OLEO-PNEUMATIC SUSPENSION
Fernand Stanislas Allinquant, Paris, France
Filed June 28, 1960, Ser. No. 39,307
Claims priority, application France July 17, 1959
5 Claims. (Cl. 280—124)

For the suspension of vehicles, more particularly motor vehicles, it is possible to use an oleo-pneumatic telescopic member interposed between an element integral with the frame and the support of the stub axle of a wheel. The cylinder of this telescopic member is connected to the frame and its piston rod is connected to the wheel support by a joint permitting the movement of the suspension by displacement of the piston in the cylinder.

The area situated directly above the piston is filled with an incompressible shock-absorbing fluid, for example oil, above which is a compressible fluid, for example compressed air. The area occupied by the oil is separated into two compartments by a transverse partition having passages of small cross-section, the opening of which is controlled by appropriate valves. The force developed by the suspension corresponds to the pressure of the compressed air, which the movements of the piston vary by increasing or reducing the volume of the area in which the air is enclosed. The resistance to the flow of oil through the passages in the transverse partition ensures the damping of these movements.

It is advantageous to correct the trim of the suspension, that is to say to regulate the bearing force of its resilient member according to the load, in such a manner that the vehicle frame has a constant mean position, irrespective of the load applied to the vehicle, the frame being able to oscillate on either side of this mean position in the amplitude limits of the normal functioning of the suspension.

For this purpose, it has already been proposed to inject oil under pressure into the part of the suspension cylinder which is filled with oil, the quantity of oil injected depending upon the load applied to the vehicle.

These devices generally have the disadvantage of being complicated and of possessing a return circuit for the oil, which increases the risk of leakage. In addition to their fragility, these devices are expensive.

The present invention relates to a feed device for damping liquid, for example oil, which does not possess the aforesaid disadvantages.

According to the invention, the feed device, which may be common to at least two suspension elements, comprises a pump immersed in an oil tank and which sends oil into the separate feed pipelines for each of the suspension elements, said pipelines serving for the return of the oil forced back by the pistons of the shock-absorber element and reintroduced into the tank, means being provided for preventing the oil from returning directly to said pump.

At each of the outlets of the pump immersed in the tank, there is advantageously provided an element comprising a duct putting into communication the delivery of the pump with a conduit terminating at the suspension element and a duct, the opening of which is controlled, for example by an electrically operated valve, and which connects the said conduit and the interior of the tank for the return of the oil.

According to a constructional form of the invention, the oil pump is formed by three gears, a central motor pinion driving two lateral pinions, housed in appropriate recesses of a casing having two passages for the admission of the liquid of the tank into the recesses, and two independent delivery passages, each connected to the conduit opening into the cylinder of the suspension element associated with said conduit.

The following description, with reference to the accompanying drawings, will enable the various features of the invention to be well understood.

Figure 2:
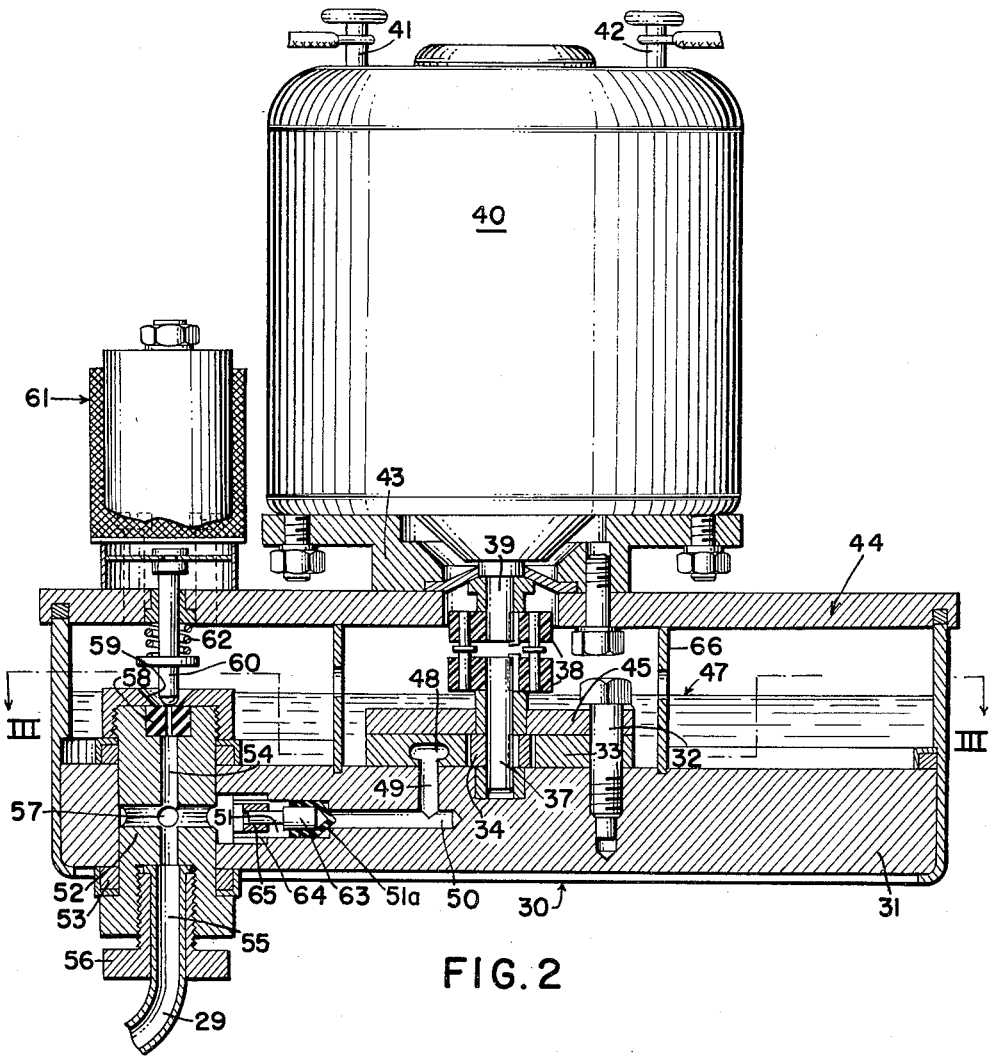
Figure 3:
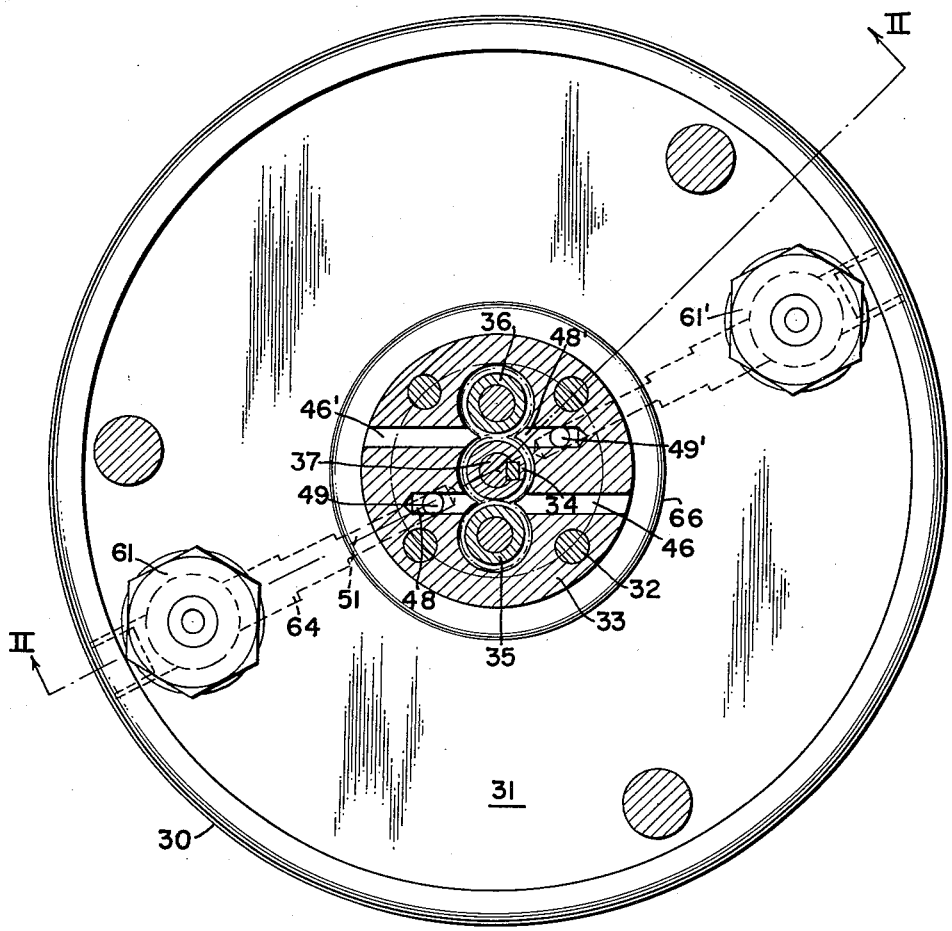

FIGURE 1 is a diagrammatic view with a section of a suspension element associated with a motor vehicle wheel and to which is added a trim corrector according to the invention, FIGURE 2 shows in vertical section, on the line II—II of FIG. 3, a trim correcting device according to the invention, and FIGURE 3 is a section on the line III—III of FIGURE 2.

FIGURE 1 shows diagrammatically a suspension element of a motor vehicle, for example for a rear wheel 1 carried by a stub axle 2. The shock-absorber comprises a cylindrical casing 3 fixed to an element 4 of the frame or body of the vehicle, and in which slides a piston 5. The rod 6 of the piston is guided at end 7 of said casing where it passes from the latter and is pivoted at one end 8 to a part 9 integral with the stub axle 2 of the corresponding wheel.

The area of the cylinder 3 situated above the piston 5 is filled with oil or other damping liquid and is separated into two compartments 10, 11 by a transverse partition 12. This partition is pierced by passages parallel to the axis of the cylinder and divided into two groups 13 and 14. It comprises on each of its faces a valve formed by a flexible metal disc or foil 15 (16). The foil 15 is pierced by orifices 15a coaxial with the passages of the group 13, while the foil 16 is pierced by orifices 16a coaxial with the passages of the group 14.

The foils thus control the orifices of the passages so that the group 13, for example, serves for the transfer of oil from the compartment 10 to the compartment 11 during the descent of the piston, while the other group 14 serves for the transfer of oil in the opposite direction when the piston ascends in the cylinder.

Curved washers 17, 18 are applied against the foils 15, 16 for limiting the deformation of the said foils during their opening by the oil pressure.

A rod 19 passes through a fixed element 4a of the frame, and one end is pivoted at 20 to the stub axle 2, while the other end carries a sort of stop 21. This rod is for limiting the vertical movement of the frame relatively to the wheel (that is to say the bottom position of the piston), the stop then coming into contact with a washer 22 carried for this purpose by the element 4a of the frame.

The compartment 10 of the shock-absorber communicates freely by means of a conduit 23 passing into the cylinder 3 in a fluid-tight manner at 24 and with an enclosure 25, likewise containing oil and a compressible fluid, for example compressed air. The oil (at 26) and the compressed air (at 27) may be separated by a flexible partition, such as a resilient diaphragm 28.

The force developed by the suspension corresponds to the pressure of the compressed air, which the movements of the piston vary by increasing or reducing the volume of the space 27 in which the air is enclosed.

Of course, an identical suspension (not shown) is associated with the other wheel of the set of wheels. Each of the spaces 26 of the enclosures or chambers 25 is connected by a conduit 29 (29′) to an oil tank 30, in which is provided the trim correcting device forming the subject of the present invention (FIGURES 2 and 3).

The bottom of the tank 30 is formed by a block 31 of relatively considerable thickness, on which is fixed, for example by means of screws 32, a plate 33 acting as a casing for an oil pump immersed in the oil contained in said tank. Circular recesses provided in this plate allow three toothed pinions 34, 35, 36, the centres of which are in alignment, to be housed. The lateral pinions 35 and 36 are mounted idly on their shafts and mesh with the central pinion or motor pinion 34. The shaft 37 of this central pinion is connected by any suitable coupling 38 to the shaft 39 of an electric motor 40, the terminals 41 and 42 of which are connected, for example, to the accumulator battery of the motor vehicle. In the example in the drawing, the motor 40 is fixed on a support 43 secured to the cover 44 of the tank.

A plate 45, through which passes the shaft 37 of the central pinion, forms a fluid-tight cover for the casing 33 of the oil pump and is clamped to it by the screws 32.

The plate or pump casing 33 is formed with parallel lateral passages 46 and 46', perpendicular to the line of the centres of the pinions and arranged on either side of said line. Each passage provides communication between the interior of the tank 30, below the level 47 of the oil contained therein, and the circular housings provided in the casing 33 for the gears of the pump.

The passages 46, 46' extend beyond the line of the centres of the pinions, at 48 and 48', respectively and communicate each with a bore 49 (49') extending perpendicularly of the plate 33.

Each of these bores such as 49 is extended by a bore 50 provided in the block 31 forming the bottom of the tank 30 and terminates in a passage 51 parallel to the bottom of said tank 30, such that from the pump outlet the oil driven by the two gear pairs 34—35 and 34—36 follows two different paths. The passage 51 communicates with a larger passage 64. In passage 51 is a non-return valve 63 sliding in a small bearing 65 located in the passage 64. The junction between bore 50 and passage 51 provides an abutment 51a for the non-return valve. The passage 64 communicates with an element 52, passing through the width of the block 31 in a fluid-tight manner, sealing joints 53 being provided for this purpose. Passing longitudinally through this element is a passage 54 opening towards the exterior of the tank into a chamber 55. A connecting member, for example a sleeve 56 screwed on the element 52, enables the end of the conduit 29, connected to the container 25 of the shock-absorber, to be fixed in the chamber 55. Communication between the passage 51 of the block 31 and the passage 54 of the element 52 is ensured by a circular groove and radial passages 57 provided in said element.

The end of the passage 54, which is situated opposite the chamber 55 in the element 52, terminates in an enlarged part in which is disposed an orifice element 58 having an orifice therein of small diameter. The element 58 is held in place by a screw cap having a chamfered opening 59 through which extends a needle 60 of an electrically operated valve denoted generally by 61. As shown in FIGURE 2, the needle 60 functions in cooperation with said orifice in the element 58 to control movement of liquid from passage 54 into the interior of the tank 30.

The body of the electrically operated valve is situated externally of the tank 30 and its needle passes through the cover 44 of said tank. A spring 62, coiled on the needle, urges the latter constantly against the seat 59. This spring is selected so that a given over-pressure in the longitudinal passage 54 causes the needle 60 to be lifted against the action of said spring. The electrically operated valve thus acts as a safety valve.

It will be appreciated from the foregoing that the element 52 permits oil delivered by the gear pump from the tank 30 to be sent to the conduit 29, and also to return to said tank the oil flowing in the opposite direction in said conduit 29.

There is of course an element identical with 52 associated with the conduit 29' of the second shock-absorber and comprising a duct for the passage of liquid delivered by the pump through the passage 49' and an orifice controlled by an electrically operated valve 61', for permitting oil passing through the same conduit 29', but in the opposite direction, to flow into the tank 30.

FIGURE 2 also shows at 66 perforated walls or circular baffles, perpendicular to the bottom of the tank and dividing the interior of the tank into a certain number of compartments (one baffle forming two compartments in the example of the drawing), communicating with each other for a given oil level. The purpose of these baffles 66 is to prevent the admission orifices of the passages 46 and 46' of the pump from being uncovered when, due to the inclination of the vehicle, bumps, etc., the bottom of the tank 30 makes an appreciable angle to the horizontal.

The operation of the trim correcting device according to the invention will now be explained on the assumption that the electrically operated valves 61 and 61' are actuated by a single control at the disposal of the driver of the vehicle, the control of the motor 40 being likewise effected manually by the driver. For this purpose, there may be provided on the vehicle dashboard a dial giving, for example, the position of the frame relatively to the wheels, and buttons for starting or stopping the motor 40 and for actuating the electrically operated valves 61 and 61' so that the needles are or are not applied to their seats.

The operation would, however, be the same if the control of the electric motor and the electrically operated valves were automatic, suitable installations permitting these controls to be dependent on the position of the frame relatively to the wheels, irrespective of the load applied to the vehicle.

When it is desired to raise the frame relatively to the wheels, the electric motor 40 is started. The shaft 39 of the motor drives the central pinion 34 of the gear pump which draws through the passages 46, 46' oil contained in the tank 30 and forces this oil through the separate passages 48, 48'.

It should be noted that some of the oil drawn in the passage 46 is driven by the central pinion 34 into the passage 48'. Similarly, some of the oil drawn into the passage 46' passes into the passage 48. With the three-gear pump described, therefore, it is possible to deliver as large a quantity of oil as would be done by two simple pumps equipped with the same gears.

The oil then passes through the passages such as 51, pushes back the valve 63 and enters the passage 54 of each of the elements 52. If the needles 60 are applied to their seats 59 by the electrically operated valves for obstructing the corresponding end of the passage 54, the oil under pressure flows in the conduits 29, 29' to enter the containers 26 of the shock-absorbers associated with the wheels of the same set.

The volume of the area occupied by the oil above the piston 5 in the shock-absorber 3, for example, increases so that the frame is lifted relatively to the wheels. The motor 40 is stopped when the desired position of the frame has been obtained.

The movements of oscillation of the piston cause the compressed air pressure to vary, this pressure corresponding to the force developed by the suspension. The resistance to the flow of oil through the passages of the partition 12 ensures the damping of these movements.

If, on the contrary, it is desired to lower the frame, the electrically operated valves 61, 61' are acted upon so that the needles 60 are lifted off their seats.

The pressure of the oil forced back by the suspension pushes back the valves 63, so that the delivery passages 51 of the pump are obstructed, the oil being prevented from returning to the pump. The liquid therefore returns to the tank 30 through the orifice elements 58 of the passages 54 provided in the elements such as 52.

Thus, the path of the oil in the two directions, for the shock-absorber 3 for example, is provided by a single pipeline 29, and the liquid driving pump is entirely immersed in the oil. Construction of the device is therefore considerably facilitated and the cost is correspondingly reduced. In addition, by means of this arrangement, excellent fluid-tightness can be ensured, the risks of leakage being reduced to a minimum.

Furthermore, it should be noted that, according to the invention, two separate circuits are obtained for the two shock-absorber elements, from the pump outlet without having to employ a distributing device.

It is obvious that modifications may be made in the constructional forms which have just been described, more particularly by substitution of equivalent technical means, without having to depart from the scope of the invention for that purpose.

What is claimed is:

1. A device for regulating the oleo-pneumatic suspension of a vehicle having at least two suspension elements and ensuring the correction of the trim of said suspension either by injecting liquid under pressure into cylinders of the suspension elements, or by withdrawing liquid from said elements, said device comprising, in combination in the same unit, a liquid tank, a pump immersed in the liquid of said tank, passage means provided in the interior of the tank and connected to the delivery side of said pump, non-return valves in said passage means for preventing the return of liquid to the pump through said passage means, conduits equal in number to that of the suspension elements and each connecting a different one of said suspension elements both to said passage means and to the interior of said tank, and said conduits having electrically operated valves controlling the return of liquid from said conduits into said tank, whereby the said conduits between said tank and said suspension elements are each operative both for injecting liquid under pressure from said pump into a related cylinder of the suspension and for withdrawing liquid from said related cylinder, through said controlled discharge members and into said tank.

2. A device for regulating the oleo-pneumatic suspension of a vehicle having plural suspension elements and ensuring the correction of the trim of said suspension either by injecting liquid under pressure into cylinders of the suspension elements, or by withdrawing liquid from said elements, said device comprising, in combination in the same unit, a liquid tank, a pump immersed in the liquid of said tank, passage means provided in the interior of the tank and connected to the delivery side of said pump, non-return valves in said passage means for preventing the return of liquid to the pump through said passage means, conduits equal in number to that of the suspension elements and each connecting a different one of said suspension elements both to said passage means and to the interior of said tank, and said conduits having controlled discharge members for permitting the return of liquid therefrom into said tank, whereby the said conduits between said tank and said suspension elements are each operative both for injecting liquid under pressure from said pump into a related cylinder of the suspension and for withdrawing liquid from said related cylinder, through said controlled discharge members and into said tank; said pump including three coacting gears comprising a central motor-driven pinion and two lateral pinions, a casing having recesses in which said pinions are housed, admission passages in said casing for the admission of liquid to said recesses and delivery passages in said casing each connected independently to said passage means and communicating through the latter with a different conduit associated with said suspension.

3. A device for regulating the oleo-pneumatic suspension of a vehicle having at least two suspension elements and ensuring the correction of the trim of said suspension either by injecting liquid under pressure into cylinders of the suspension elements, or by withdrawing liquid from said elements, said device comprising, in combination in the same unit, a liquid tank connected to said suspension elements, a pump immersed in the liquid in said tank, passages provided in the interior of the tank and connected to tubulures connecting the suspension elements to the tank, said tubulures being equal in number to that of the suspension elements, each of said passages being connected to the delivery side of the pump, a non-return valve in each of said passages for preventing the return of liquid therethrough to the pump, baffles perpendicular to the bottom of the tank and dividing the latter into plural compartments, which communicate with each other only when the liquid reaches a predetermined level, and controlled discharge members connected to said passages for permitting the return of the liquid to said tank through the same tubulure.

4. A device for regulating the oleo-pneumatic suspension of a vehicle comprising at least two suspension elements and ensuring the correction of the trim of said suspension either by injecting liquid under pressure into cylinders of the suspension elements, or by withdrawing liquid from said elements, said device comprising, in combination in the same unit, a liquid tank having a bottom in the form of a block member, a pump immersed in the liquid of said tank and adjacent to said block member, passage means provided in said block member and connected to the delivery side of said pump, non-return valves in said passage means for preventing the return of liquid to said pump through said passage means, conduits equal in number to that of the suspension elements and each connecting a suspension element to said tank, hollow members in said block member equal in number to that of the conduits, each hollow member connecting one of said conduits to the interior of said tank, duct means in said hollow members for connecting said conduits to said passage means, and controlled discharge members on said hollow members for permitting the return of liquid from said suspension elements into said tank, whereby the same ducts between said tank and said suspension elements are operative both for injecting liquid under pressure from said pump into the cylinders of the suspension elements and for withdrawing liquid from said suspension elements through said controlled discharge members.

5. A device according to claim 4, further comprising an electric motor for driving said pump, said motor being connected to the accumulator battery of the vehicle equipped with the oleo-pneumatic suspension.

References Cited in the file of this patent

UNITED STATES PATENTS

| | | |
|---|---|---|
| 2,809,051 | Jackson | Oct. 8, 1957 |
| 2,843,396 | Lucien | July 15, 1958 |